July 26, 1960 R. H. JAHNKE 2,946,234
PRESS BRAKE

Original Filed Jan. 11, 1956 3 Sheets-Sheet 1

INVENTOR:
ROBERT H. JAHNKE.
BY
ATTORNEYS.

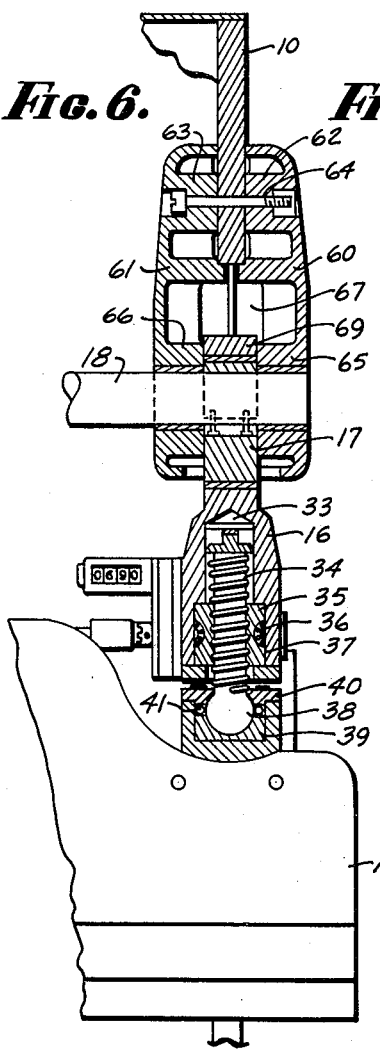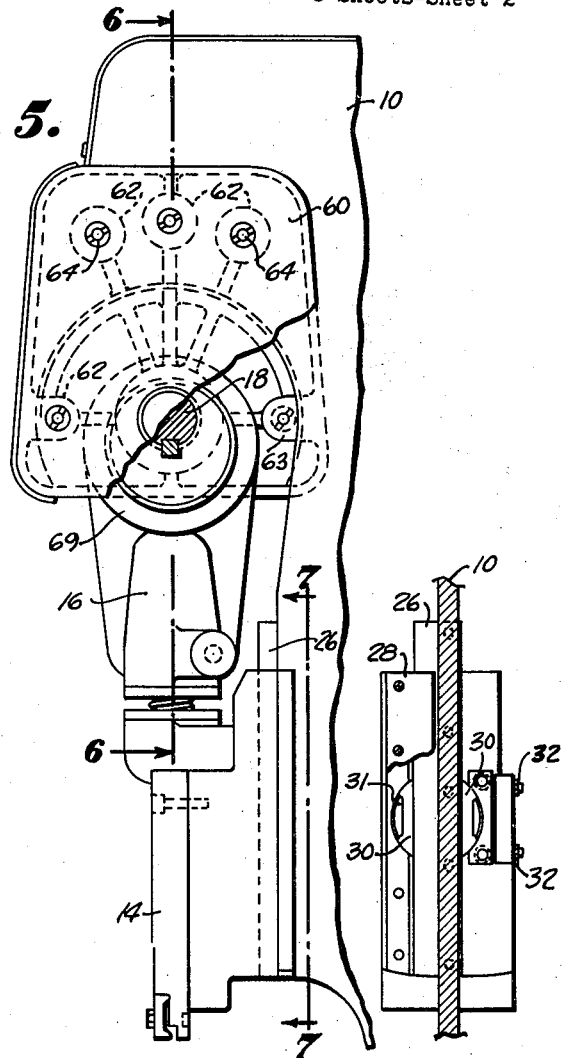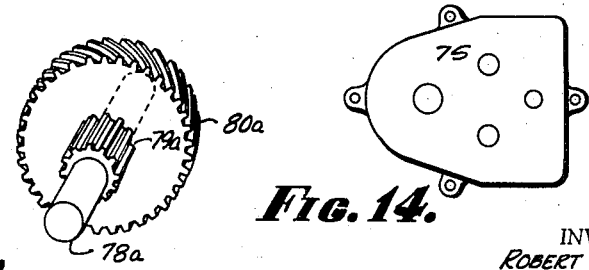

July 26, 1960 R. H. JAHNKE 2,946,234
PRESS BRAKE
Original Filed Jan. 11, 1956 3 Sheets-Sheet 3
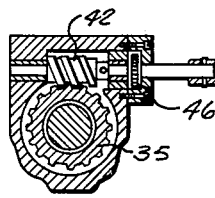
FIG. 9.
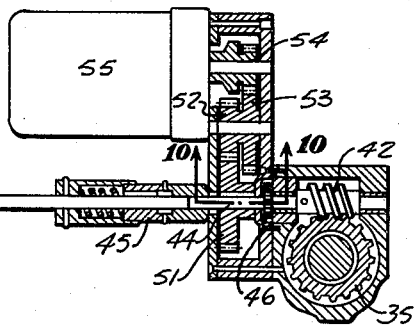
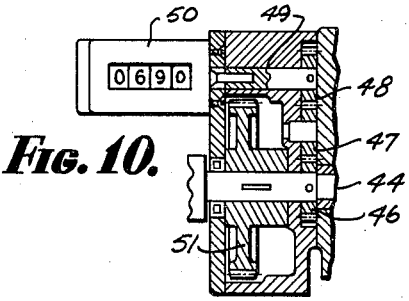
FIG. 10.
FIG. 11.
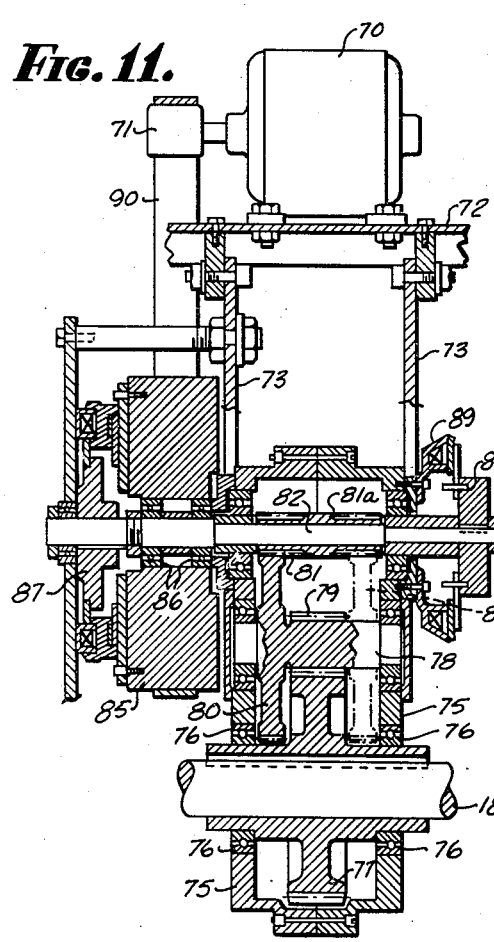
FIG. 13.
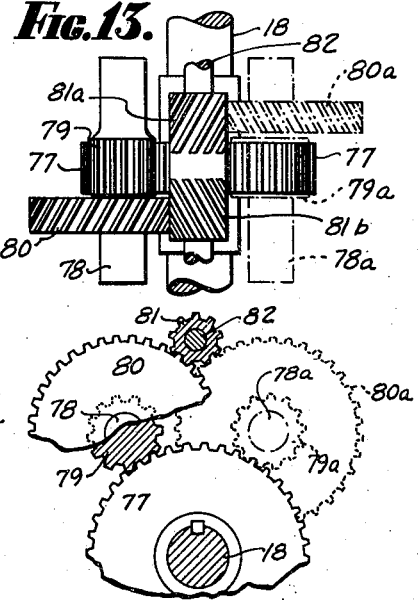
FIG. 12.
INVENTOR.
ROBERT H. JAHNKE,
BY
ATTORNEYS.

United States Patent Office 2,946,234
Patented July 26, 1960

2,946,234
PRESS BRAKE

Robert H. Jahnke, Cincinnati, Ohio, assignor to The Cincinnati Shaper Co., Cincinnati, Ohio, a corporation of Ohio Original application Jan. 11, 1956, Ser. No. 558,509. Divided and this application July 27, 1959, Ser. No. 829,725

9 Claims. (Cl. 74—421)

This invention relates to a press brake and more particularly to a relatively small inexpensive press brake which lends itself to quantity production. This application is a division of my copending application Serial No. 558,509, filed January 11, 1956 and now abandoned.

It is an object of the present invention to provide a press brake having a frame construction which lends itself to the effecting of considerable economies in manufacture. It is another object of the invention to provide a novel bearing structure for the main shaft of a press brake which facilitates assembly and repair of the brake and which makes it possible to simplify the frame of the machine.

It is still another object of the invention to provide a novel drive transmission for the press brake which also lends itself to quantity production. In connection with the last named object, it is an ancillary object to provide a transmission construction which is standard but which may be adapted to a relatively light duty press brake or by the addition of several parts, to a heavier duty press brake.

Another object involves the provision of a novel adjustment for the ram of the press brake which greatly simplifies the operation of the brake.

These and other objects of the invention which I shall describe in greater detail hereinafter or which will be apparent to one skilled in the art upon reading these specifications, I accomplish by the certain construction and arrangement of parts of which I shall now disclose an exemplary embodiment.

Reference is made to the drawings forming a part hereof and in which:

Figure 5 is a fragmentary elevational view with parts in section and parts broken away as seen from the right side of Figure 2 on an enlarged scale.

Figure 6 is a cross-sectional view taken on the line 6—6 of Figure 5.

Figure 7 is a fragmentary cross-sectional view taken on the line 7—7 of Figure 5 with parts broken away.

Figure 8 is a perspective view of an intermediate shaft and a gear pair utilized in the transmission.

Figure 9 is a cross-sectional view taken on the line 9—9 of Figure 2.

Figure 10 is a fragmentary cross-sectional view on an enlarged scale taken on the line 10—10 of Figure 9.

Figure 11 is a cross-sectional view on an enlarged scale taken on the line 11—11 of Figure 2.

Figure 12 is a semi-diagrammatic elevational view of the gear train in the transmission as seen from the right of Figure 11.

Figure 13 is a plan view of Figure 12, and

Figure 14 is an elevational view of a housing member for the transmission.

Briefly, in the practice of my invention, I provide a press brake having a very simplified frame consisting essentially of two heavy side plates. A lower die is secured to a transverse member extending between the side plates while an upper die is secured to the ram which is vertically reciprocable on the side plates. The ram is reciprocated by connecting rods operated by eccentrics on the main shaft. The bearings for the main shaft are in separate bearing plates which are secured over openings in the side plates. The transmission from a drive motor to the main shaft is through a gear train which may be of one type for a relatively light duty brake and which may be reinforced by additional gears fitted in the standard transmission housing for a heavier duty brake.

Figure 1:
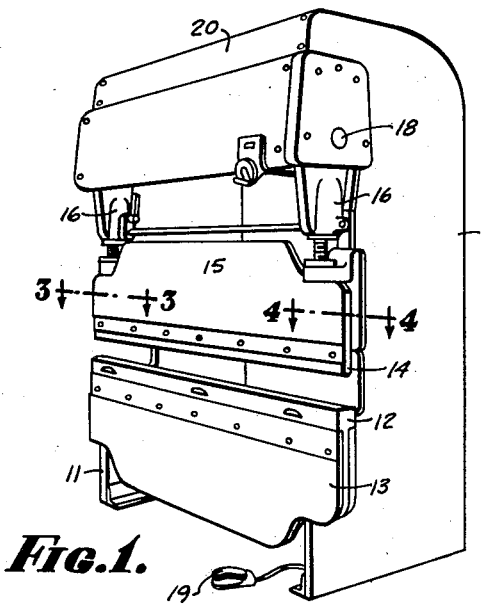
Figure 1 is a perspective view of a press brake according to my invention.

The general appearance of the press brake is best seen in Figure 1 where the side plates are indicated at 10 and 11. The lower die 12 is secured to a beam member 13 extending between the side plates 10 and 11. This is the fixed die member. The movable or reciprocating die member 14 is secured to a ram 15 which is reciprocated vertically by the connecting rods 16, actuated by the eccentrics 17 secured to the main shaft 18 of the machine. A foot switch for operating the machine is indicated at 19. A sheet metal cover member, giving the machine a smooth finished appearance is indicated at 20.

Figure 3:
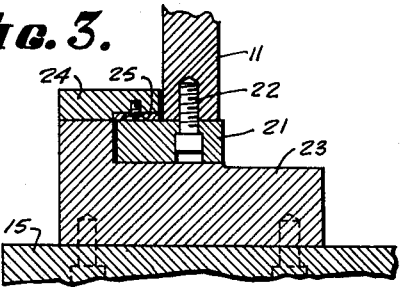
Figure 3 is a fragmentary cross-sectional view on an enlarged scale taken on the line 3—3 of Figure 1.

The ram 15 reciprocates on ways secured to the side plates 10 and 11. By reference to Figure 3, it will be observed that a way 21 is secured to the plate 11 by means of machine screws 22 and that a rail 23 is secured by machine screws to the back of the ram 15. A retainer plate 24 is provided with a bearing surface 25 to engage the rear face of the rail 21.

Figure 4:
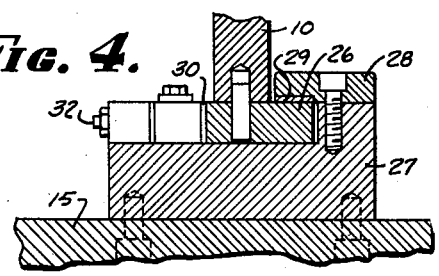
Figure 4 is a similar view taken on the line 4—4 of Figure 1.
Figure 2:
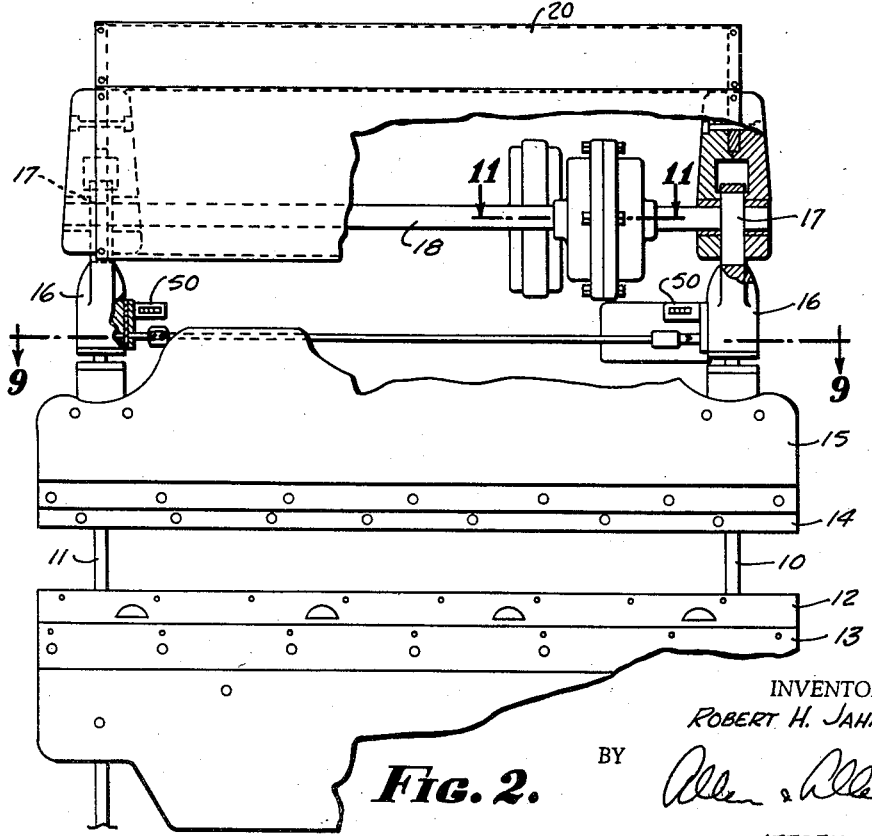
Figure 2 is a fragmentary front elevational view of the same with parts broken away and parts in section.

The structure at the other end of the ram is slightly modified because of the fact that under some conditions it is desirable to adjust the ram to move the die 14 out of parallelism with the die 12. Thus, by reference to Figures 4 and 7, it will be observed that a way 26 is secured to the side plate 10 and again a rail 27 is secured to the rear of the ram 15 and again a retainer plate 28 is provided with a bearing surface 29 for engaging the rear face of the way 26.

The way 26 passes between the part circular blocks 30, best seen in Figure 7, which ride in the part circular slots 31. By reference to Figure 7, it will be clear that the way 26 has clearance except where it passes between the blocks 30 and the pressure of the blocks 30 against the way 26 can be adjusted by the bolts 32. In this way, smooth and chatter-free guiding of the rail 27 is accomplished even if there is a slight misalignment of the ram.

The ram is operated by the connecting rods 16 which are driven as will hereinafter be described. Each of the connecting rods 16 is provided with a bore 33 in which is deposited a threaded connecting rod extension 34. An internally threaded nut 35 having a worm wheel configuration 36 on its exterior surface is rotatable in a recess 37, so that rotation of the nut 35 produces an extension of the member 34. The member 34 is formed at its lower end with a ball-like configuration 38 and exerts its pressure against a block 39 having a mating spherical surface. A retaining plate 40 engages the upper portion of the member 38 in retracting the ram. A bearing may be provided at 41.

It will now be clear that rotation of the nut 35 produces an extension or retraction of the member 34. As best seen in Figure 9, a worm 42 engages with the nut 35 and the worm 42 at the left of Figure 9 is secured to a shaft 43 extending transversely of the machine while the worm 42 at the right is secured to a short shaft 44. The two shafts are coupled together by a clutch 45 so that rotation of the shaft 43 normally produces equal movement of the two extensions 34. It will be clear that if it is desired to move the right extension 34 while leaving the left extension stationary, the clutch 45 may be manually disengaged for the purpose.

Each of the shafts 43 and 44 carries a small gear 46 which, through an intermediate gear 47 (Figure 10), drives a gear 48 secured to the shaft 49 of a counter 50. The shaft 44 also carries a gear 51 which, through the gear train 52, 53, 54, is driven by the motor 55.

It will now be clear that when the motor 55 is energized the motor drives through the gears 54, 53, 52 and 51 to the shaft 44 which is normally clutched to the shaft 43 so that both nuts 35 will be rotated to extend or retract the connecting rod extensions 34 depending upon the direction of rotation of the motor. It will also be clear that the amount of extension or retraction will be indicated by two indicators 50. It will also be clear that if it is desired to set the ram out of parallelism, the clutch 45 may be manually disengaged so that as the motor 55 is then operated in one direction or the other, the shaft 44 only will be rotated so that only the connecting rod extension at the right side of the machine will be moved. The counters 50 may be calibrated in one thousandths of an inch and it is readily possible to determine the difference in setting between the two connecting rod extensions. Parallelism may be restored at any time by disengaging the clutch 45 and operating the motor 55 in the appropriate direction until the two counters 50 read alike.

Referring now more particularly to Figures 5 and 6 for a description of the mounting of the main shaft 18, it will be seen that the side plates 10 and 11 are cut away in the region of the shaft 18 in a sort of question mark configuration and that the bearings for the main shaft 18 at each end are constituted by the journal plates 60 and 61. These journal plates are provided with the bolt bosses 62 and 63 and are secured to each other and to the plates 10 and 11 respectively by the bolts 64. These journal plates also have the bearing bosses 65, 66 and between them there is a circular recess 67 to accommodate the throw of the eccentric and the connecting rod yoke. An eccentric 17 is keyed to the shaft 18 and is engaged by the yoke 69 of the connecting rod 16.

It will be clear that this construction simplifies the building of the machine and the servicing thereof because it is only necessary to remove the journal plates 60 and 61 to remove the main shaft 18 from the machine. For inspection purposes only the journal plate 60 need be removed. A further advantage will appear from a consideration of Figure 6 in that the thrust of the eccentric and contacting rod is substantially in the plane of the side plate 10, so that there is no torque or bending moment on the machine frame during any part of the operation.

Coming now to the drive for the main shaft and with particular reference to Figures 11, 12 and 13, the drive motor is indicated at 70 and may be provided with a pulley 71. It is suitably mounted on a mounting bracket 72 to which are secured the brackets 73. To these brackets in turn is secured the transmission now to be described.

The transmission comprises a pair of housing members such as shown in Figure 14 and indicated at 75. Bearings are provided at 76 for the main shaft 18 to which is keyed a gear 77. An intermediate shaft 78 carries a gear and pinion pair with the pinion 79 meshing with the gear 77. The gear 80 meshes with a pinion 81 on an input shaft 82. It will be noted that the pinion 81 is disposed adjacent one side of the housing as is the gear 80, whereas the pinion 79 is substantially centrally disposed within the housing as is the gear 77. The housing as seen in Figure 14 is provided with bearings for two intermediate shafts 78, so that if desired an additional pinion 81a may be disposed upon the input shaft 82 and an additional gear pair, such as shown in Figure 8, may be mounted upon an additional intermediate shaft and disposed as indicated in broken lines in 11, 12 and 13, the additional gear being indicated at 80a, the additional pinion at 79a and the additional intermediate shaft at 78a. It will of course also be clear that instead of providing the two small pinions 81 and 81a, these could be replaced by a single long pinion as indicated at 81b in Figure 13.

In practice, the housing members 75 are standard and provide journals for both intermediate shafts if they are desired. If it is desired to produce say a 30 ton press brake, I utilize only the gears 81, 80, 79 and 77. If it is desired to produce say a 50 ton press brake, however, I here add an additional pinion 81a or substitute a long pinion 81b and add a second intermediate shaft 78a with its gear and pinion pair 79a, 80a. The gear tooth pressure is thus cut in half with the pinions 79 and 79a engaging the gear 77 at spaced points on its periphery. Since the unit comprising an intermediate shaft 78, pinion 79 and gear 80 is a standard unit, and since the housing members 75 are standard, production is greatly simplified for the production of two different size machines.

In accordance with known practice, the pinion 81 and 81a are helical pinions of opposite hand, and the gears 80 and 80a are also helical gears of opposite hand. Thus by a slight axial shift of the pinions 81 and 81a, the torque transmitted can be equalized between the gears 80 and 80a. Of course if the pinion 81a and gear 80a are omitted for a light duty brake, the pinion 81 and gear 80 could be of the spur type. For quantity production purposes, however, they will still preferably be of the helical type.

To complete the drive, the input shaft 82 carries a fly wheel 85 freely rotatable on the shaft 82 on bearings 86 and the shaft 82 carries a magnetic clutch element 87 keyed thereto so that the shaft 82 may be electromagnetically clutched to the fly wheel 85 when the clutch is energized. Similarly, the shaft 82 carries one element of an electromagnetic brake keyed thereto as at 88 and the other element of the electromagnetic brake 89 is secured to the housing. The electromagnetic clutch and brake are connected so that one is energized when the other is deenergized. Power is transmitted from the pulley 71 to the fly wheel 85 by the belt 90.

It will be clear that various modifications may be made without departing from the spirit of my invention and I therefore do not intend to limit myself except as set forth in the claims which follow.

Having now fully described my invention, what I claim as new and desire to secure by Letters Patent is:

1. In a press brake having a frame, a main shaft journaled in said frame, and a drive motor; a transmission comprising a housing secured to said frame, bearings in said housing for said main shaft, a gear secured to said main shaft substantially centrally within said housing, an input shaft journaled in said housing, means to drive said input shaft from said drive motor, a pinion on said input shaft adjacent one side of said housing, an intermediate shaft journaled in said housing, and carrying a gear in meshing relation with said pinion and a pinion in meshing relation with said first named gear, said housing having journals for a second intermediate shaft at the same distance from said main shaft as said first mentioned intermediate shaft but circumferentially spaced therefrom, whereby said transmission may be reinforced by the addition of a second intermediate shaft, a second gear and pinion for said second intermediate shaft, and a second pinion for said input shaft.

2. In a press brake having a frame, a main shaft journaled in said frame, and a drive motor; a transmission comprising a housing secured to said frame, bearings in said housing for said main shaft, a gear secured to said main shaft substantially centrally within said housing, an input shaft journaled in said housing, means to drive said input shaft from said drive motor, two helical pinions oppositely disposed on said input shaft, a pair of intermediate shafts journaled in said housing, each carrying a helical gear in meshing relation with one of said pinions and a pinion in meshing relation with said first named gear at circumferentially spaced points.

3. A structure according to claim 1, wherein said second intermediate shaft, second gear and input shaft pinion, and second pinion are duplicates of the first mentioned intermediate shaft, gear and pinion, and input shaft pinion.

4. A structure according to claim 1, wherein said means to drive said input shaft from said drive motor comprises a fly wheel freely rotatable on said input shaft externally of said housing, a belt drive for said fly wheel, an electromagnetic clutch disc keyed to said input shaft and magnetically clutchable to said fly wheel.

5. A structure according to claim 2, wherein said means to drive said input shaft from said drive motor comprises a fly wheel freely rotatable on said input shaft externally of said housing, a belt drive for said fly wheel, an electromagnetic clutch disc keyed to said input shaft and magnetically clutchable to said fly wheel.

6. A structure according to claim 1, wherein an electromagnetic brake element is keyed to said input shaft and is disposed in operative relation to an electromagnetic brake element secured to said housing.

7. A structure according to claim 2, wherein an electromagnetic brake element is keyed to said input shaft and is disposed in operative relation to an electromagnetic brake element secured to said housing.

8. A structure according to claim 1, wherein said means to drive said input shaft from said drive motor comprises a fly wheel freely rotatable on said input shaft externally of said housing, a belt drive for said fly wheel, an electromagnetic clutch disc keyed to one end of said input shaft and magnetically clutchable to said fly wheel, an electromagnetic brake element keyed to the other end of said input shaft in operative relation to an electromagnetic brake element secured to said housing.

9. A structure according to claim 2, wherein said means to drive said input shaft from said drive motor comprises a fly wheel freely rotatable on said input shaft externally of said housing, a belt drive for said fly wheel, an electromagnetic clutch disc keyed to one end of said input shaft and magnetically clutchable to said fly wheel, an electromagnetic brake element keyed to the other end of said input shaft in operative relation to an electromagnetic brake element secured to said housing.

No references cited.